US012786230B2

(12) United States Patent
Pospelova et al.

(10) Patent No.: US 12,786,230 B2
(45) Date of Patent: Nov. 3, 2026

(54) INTERNAL RECONNAISSANCE ATTACK IDENTIFICATION USING COMMAND LINE ANALYSIS

(71) Applicant: OPEN TEXT US LLC, Menlo Park, CA (US)

(72) Inventors: Maria Pospelova, Ottawa (CA); Hari Manassery Koduvely, Ottawa (CA); Luke Vandenberghe, Ottawa (CA)

(73) Assignee: OPEN TEXT US LLC, Menlo Park, CA (US)

( * ) Notice: Subject to any disclaimer, the term of this patent is extended or adjusted under 35 U.S.C. 154(b) by 697 days.

(21) Appl. No.: 17/868,087

(22) Filed: Jul. 19, 2022

(65) Prior Publication Data

US 2024/0031403 A1 Jan. 25, 2024

(51) Int. Cl.
*H04L 9/40* (2022.01)
*H04L 41/16* (2022.01)

(52) U.S. Cl.
CPC .......... *H04L 63/1466* (2013.01); *H04L 41/16* (2013.01); *H04L 63/1416* (2013.01); *H04L 63/1425* (2013.01)

(58) Field of Classification Search
CPC . H04L 63/1466; H04L 41/16; H04L 63/1416; H04L 63/1425
See application file for complete search history.

(56) References Cited

U.S. PATENT DOCUMENTS

| | | | | |
|---|---|---|---|---|
| 10,614,222 | B2 * | 4/2020 | Godard | G06F 21/552 |
| 2018/0240010 | A1 * | 8/2018 | Faivishevsky | G06N 3/08 |
| 2023/0096895 | A1 * | 3/2023 | Stokes, III | G06N 20/00 726/22 |

FOREIGN PATENT DOCUMENTS

| | | |
|---|---|---|
| CN | 110598397 A | 12/2019 |
| CN | 112565278 A | 3/2021 |
| CN | 111988339 B | 3/2022 |

* cited by examiner

*Primary Examiner* — Sm A Rahman
(74) *Attorney, Agent, or Firm* — Sprinkle IP Law Group

(57) ABSTRACT

Command line inputs to a system by a user or automated script can comprise a number of legitimate commands but, as a series, reveal a reconnaissance attack, such as to gain knowledge of a system without a legitimate reason to do so. A trained artificial intelligence monitors the command line inputs to the system, as a series, and determines therefrom whether a match exists to a reconnaissance attack. The match may be a non-exact match, such as a match determined by a long short-term memory (LSTM) machine learning model. A reconnaissance attack response may then be initiated upon determining a match is present.

20 Claims, 4 Drawing Sheets

INTERNAL RECONNAISSANCE ATTACK IDENTIFICATION USING COMMAND LINE ANALYSIS

FIELD OF THE DISCLOSURE

The invention relates generally to systems and methods for determining a reconnaissance attack on a system and particularly to determining an attack that may not exactly match known attacks.

BACKGROUND

Attacks on computer systems can take many forms. Unfortunately, attacks may originate from internal and external sources. Internal sources, such as authorized personnel who are granted access to the system in order to perform legitimate tasks and automated agents, which may be entirely unauthorized or authorized in one form but altered to comprise unauthorized tasks.

Many attacks are, or comprise, a reconnaissance portion. Merely obtaining system information itself may be the attack or it may be utilized as a tool to refine or otherwise aid a subsequent attack on the system. For example, the system may have nodes attached to a network that comprise a bait or "honeypot" of information that, while appearing legitimate, deliberately has misleading information. Merely knowing that a particular node should be avoided may be enough to allow an attacker to damage the system and/or acquire unauthorized information. Attacks may begin innocuously, such as by watching a system or performing authorized operations and, therefrom, gathering details. With the benefit of such information, a subsequent portion of the attack may be more focused on the learned vulnerabilities or high-value resources of a system and/or excluding or delaying attacks on low-value resources or those resources having a greater ability to thwart an attack.

SUMMARY

An agent may be authorized to access a system and implement commands, such as via a command line interface to the system. The agent may be an authorized human who is provided access to the system for legitimate purposes, but through curiosity or corruption may stray from those legitimate purposes. The agent may be an automated agent that is unknown to the system except for the command line instructions input to the system or the agent may be known, and even authorized, to perform a first, legitimate function on the system but comprise a second, illegitimate function on the system.

Performing certain operations may each be authorized and expected but, as an unordered or ordered collection (e.g., sequence), such operations indicate an attempt to gather information or perform operations that do not serve any legitimate or authorized purpose. For example, knowing which networked nodes have had a firmware update may be an authorized operation for an agent, such as to provide updates to nodes that have not been updated. However, determining that a node permits a command that is known to have a vulnerability or performing an action but not a customary follow-up action, may be outside the scope of legitimate inquiry and one example of a reconnaissance attack. This may be particularly true if such a node were to be removed from an upgrade script or if the upgrade were to be unnecessarily delayed in order to preserve the vulnerability.

Accordingly, there is a need to distinguish between internal reconnaissance and legitimate command-line behavior accurately and effectively.

These and other needs are addressed by the various embodiments and configurations of the present invention. The present invention can provide a number of advantages depending on the particular configuration. These and other advantages will be apparent from the disclosure of the invention(s) contained herein.

Internal reconnaissance is one adversarial mechanism for obtaining information about an infiltrated system or network of an organization (e.g., enterprise, government agency, educational enterprise, charity, etc.). A common method used by the adversary to acquire this information is through the execution of built-in or third-party command-line utilities. Presently, only rule-based techniques have been operationalized to directly detect internal reconnaissance behavior from the command line. For example, if a particular command is executed an alert is triggered. However, there is significant overlap between the commands entered by adversaries for internal reconnaissance activities and commands frequently issued by typical users for legitimate tasks. Deterministic detection approaches have difficulties distinguishing between internal reconnaissance and legitimate command-line behavior that fall in this overlap. Consequently, current rule-based internal reconnaissance detectors tend to possess substantially high false positives rates.

To distinguish between internal reconnaissance and legitimate command-line behavior more effectively, statistical modeling techniques can be employed. Accordingly, embodiments herein are generally directed to a machine learning approach to detecting internal reconnaissance through binary classification of command collections. It considers a number of learning methods, such as Recurrence based Neural Networks, Convolution Based Neural Networks, Transformer based Neural network model and explores their suitability for modeling internal reconnaissance behavior from the command line.

In one embodiment, command line inputs are treated in a manner akin to a language. As a result, a language-based analysis may be utilized to design different models utilized to identify malicious activity. As an example, individual command-line inputs are "words" and a series of the "words" are processed into grammar comprising a sequences of multi-"word" phrases, expressions, sentences, paragraphs, etc. As a benefit, encountering a new sequence can be processed utilizing language-based models rather than set pattern matching or other rule-based determination.

In another embodiment, certain concepts disclosed herein are applied to scripts. Scripts, such as those written in bash (on Linux/Unix systems) or PowerShell (on Windows systems), are collections of commands that run in a specific sequence. Similar to individual commands, scripts may comprise normal/expected scripts that are used to automate specific tasks on a given machine. However, scripts may comprise malware or malware may comprise scripts used to perform a nefarious action. For example, malware may reschedule itself or another malware to run off-hours, such as to be less likely to be observed by an active user, or to execute in the future as a logic bomb.

In another embodiment, certain concepts disclosed herein may be applied to Application Program Interface (API) calls. API calls, like commands, have parameters and sequences that may be normal/expected, but when abused by a malicious attacker, may show up as an unusual sequence or unusual parameter even when the command itself is normal. For example, the Log4J is a known vulnerability that uses existing command parameters in unusual ways. Grammar and usage can be identified from API calls and mapped to the language models. Such mapping may comprise the tokenizing of one or more elements of parameter(s). As a result, a match to a known malicious grammar and the parameters of an API call(s) may not be exact but may still be determined to comprise a malicious sequence.

In another embodiment, certain concepts disclosed herein may be applied to Internet of Things (IoT) devices. IoT systems such as autonomous vehicles, connected cars or trucks, smart homes, solar panels etc. can be accessed remotely through a command line interface and reconnaissance attacks could be carried out in such systems to find vulnerabilities for further attacks. IoT systems being small devices, are accessed remotely using keyboard interface, instead of through a UI.

An example is accessing an autonomous vehicle through a remote device and keyboard to find vulnerabilities for hijacking the vehicle or leading the vehicle to a crash while driving. Another example is accessing the smart homes through a remote device and keyboard to search for avenues to install botnets for DDoS attacks.

It should be appreciated that the term “internal,” as used herein, refers to an agent (human and/or automated) that have been provided with authorized access to a system, such as system administrators, operators, technicians, programmers, automated scripts, programs, etc. The authorization may be complete (e.g., root access) or partial or, in the case of automated agents, in a form and/or having a behavior that would not be an obvious threat. Such agents are allowed access to a trusted portion of the system that is excluded from non-authorized agents. It is also possible that a nefarious actor obtained authorization through deceit (e.g., social engineering) or other action to be erroneously granted access. While traditionally such activities could only be conducted while having a physical presence inside an organization’s facilities, remote access is now commonplace. Accordingly, a human agent may be physically present or located remotely and connect to the system via a remote terminal and be “internal” to an enterprise. Similarly, an automated agent may be installed on a physical component of a system located internally to an enterprise or located on a physical component having remote access to the system.

Exemplary aspects are directed to:

A system, comprising at least one processor comprising a first processor; an input component to receive command line inputs to the system; wherein the first processor monitors the command line inputs and wherein each individual command line input comprises an authorized command; wherein the first processor evaluates a series of the command line inputs as a collection and determines therefrom whether a match exists between the series of the command line inputs and a reconnaissance attack; and wherein, upon the first processor determining that the series of the command line inputs matches the reconnaissance attack, the first processor initiates an intrusion response action.

A method for protecting a system, comprising receiving command line inputs to the system; monitoring the command line inputs and wherein each individual command line input comprises an authorized command; evaluates a series of the command line inputs as a collection and determining therefrom whether a match exists between the series of the command line inputs and a reconnaissance attack; and wherein, upon determining that the series of the command line inputs matches the reconnaissance attack, the first processor initiating an intrusion response action.

A monitoring component attached to a system, comprising a processor; an input interface to receive from the system command line inputs to the system; wherein the processor monitors the command line inputs and wherein each individual command line input comprises an authorized command; wherein the processor evaluates a series of the command line inputs as a collection and determines therefrom whether a match exists between the series of the command line inputs and a reconnaissance attack; and wherein, upon the processor determining that the series of the command line inputs matches the reconnaissance attack, provides an intrusion signal to a security component of the system.

A system on a chip (SoC) including any one or more of the above aspects.

One or more means for performing any one or more of the above aspects.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases “at least one,” “one or more,” “or,” and “and/or” are open-ended expressions that are both conjunctive and disjunctive in operation. For example, each of the expressions “at least one of A, B, and C,” “at least one of A, B, or C,” “one or more of A, B, and C,” “one or more of A, B, or C,” “A, B, and/or C,” and “A, B, or C” means A alone, B alone, C alone, A and B together, A and C together, B and C together, or A, B, and C together.

The term “a” or “an” entity refers to one or more of that entity. As such, the terms “a” (or “an”), “one or more,” and “at least one” can be used interchangeably herein. It is also to be noted that the terms “comprising,” “including,” and “having” can be used interchangeably.

The term “automatic” and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware , an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
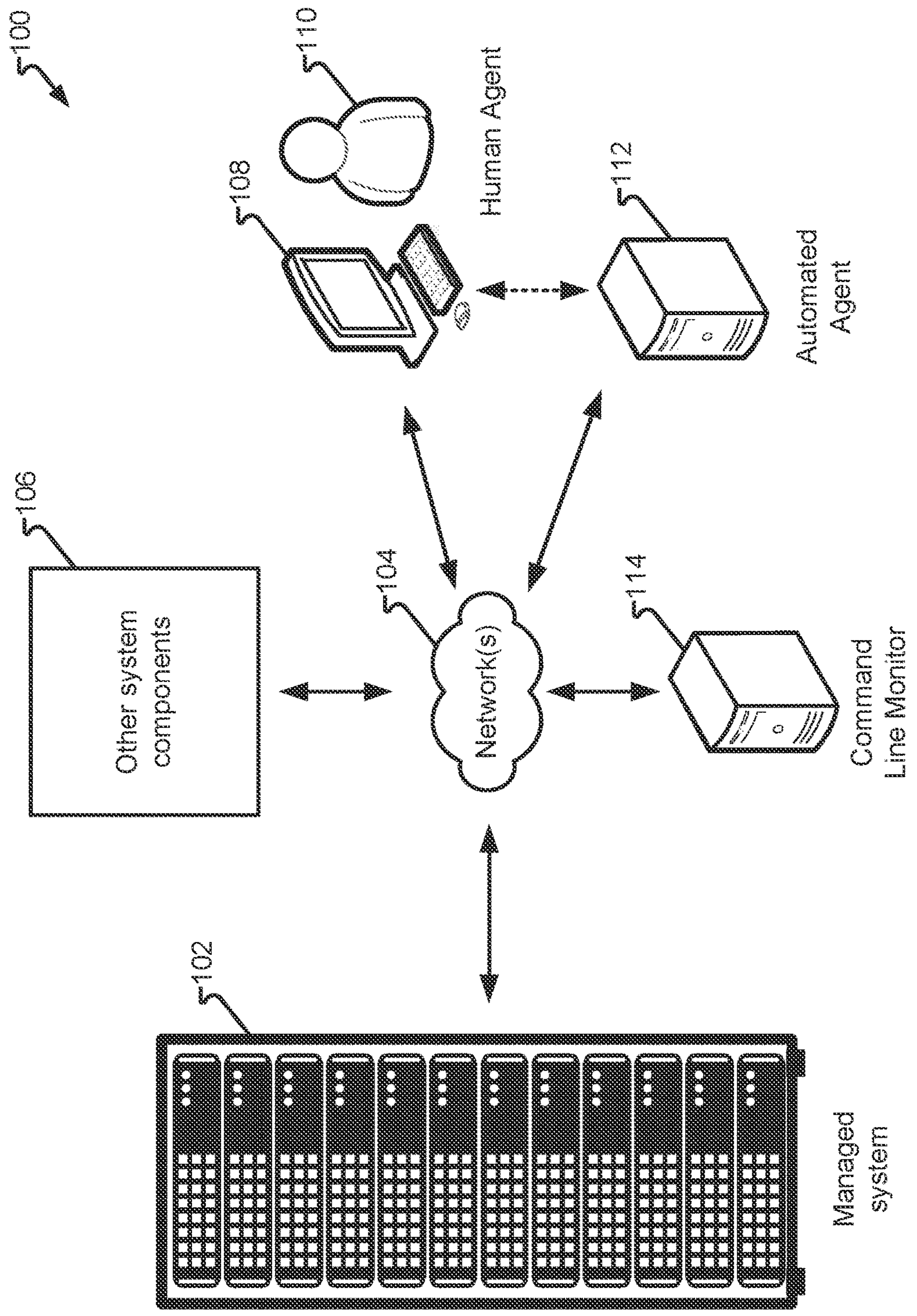
FIG. 1 depicts a system in accordance with embodiments of the present disclosure.

FIG. 1 depicts system 100 in accordance with embodiments of the present disclosure. System 100 illustrates interconnected components therein as one topology wherein discrete components perform discrete tasks. Such a topology may be helpful to describe aspects of the embodiments described, but it should be appreciated that other topologies may be utilized without departing from the scope of the embodiments. For example, in other embodiments, system 100 may be embodied as having more, fewer, or different components and/or components utilizing different network topologies.

In one embodiment, system 100 comprises managed system 102. Managed system 102 is managed, at least in part, by one or both of human agent 110, utilizing terminal 108, and/or automated agent 112. Management of system

100 may be provided, at least in part, by command line inputs manually entered, such as by human agent 110 utilizing terminal 108 and/or an automated script, program, etc., executed by automated agent 112. The presence of human agent 110 and/or automated agent 112 and the command line inputs they provide are not unexpected or an obvious security threat to other components 106 or managed system 102.

Managed system 102 may comprise processing components with at least one microprocessor, data storage components, communication components, system management components, and/or other components to perform tasks. The tasks may be utilized, in whole or in part, by other components 106. Other components 106 may comprise other computing, networking, or communication components. For example, managed system 102 may be a "back end" of an enterprise and provide data processing services. The tasks may be received from and/or provide results to other components 106, such as end user's communication node or other computing nodes.

Each component of system 100 is interconnected via network 104. Network 104 may comprise one or more of a direct connection, local network, and/or Intranet. Terminal 108 receives inputs from human agent 110, such as command line inputs, directly for either immediate execution by managed system 102 or execution at a subsequent time. Scripts may comprise one or more command line inputs, which may include parameters. Scripts may be executed by terminal 108 and/or saved and executed at a subsequent time by automated agent 112. Managed system 102 then executes the individual command line commands or series of commands within a script.

In another embodiment, command line monitor 114 monitors the command line inputs as a collection. Optionally, command line monitor 114 may determine if any individual command is a threat and, if so, trigger an attack response. However, and as previously described, many command line inputs are, by themselves, normal and expected but, as a collection, unnecessary except for a curious or nefarious agent to "snoop" and potentially gain knowledge of managed system 102 and/or other components 106. Such actions may be reconnaissance to determine vulnerabilities and/or identify high-value targets of managed system 102 and/or other components 106. As a result, a subsequent attack may be more targeted and successful, even if discovered and shut down relatively quickly. For example, an attack may attempt to gain access to a system by probing a set of ports. Such an attack is relatively easy to identify, but only after a pattern of attacks emerges. If the component is vulnerable or maintains high-value data, the attack may be successful even if shut down after a few seconds.

Accordingly, and in another embodiment, command line monitor 114 examines the command line inputs as a collection, similar to a grammar for a language, to determine if a reconnaissance attack is being performed versus legitimate management of managed system 102.

Figure 2:
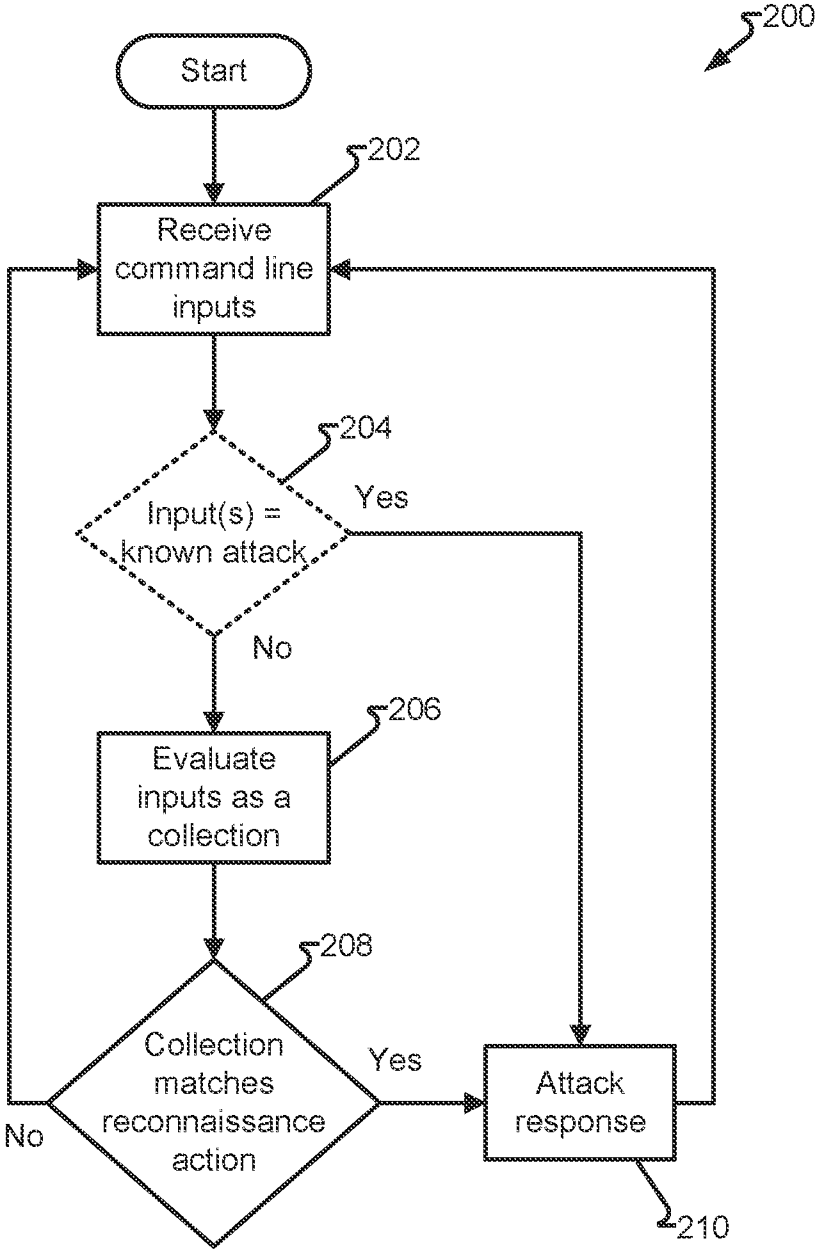
FIG. 2 depicts a process in accordance with embodiments of the present disclosure.

FIG. 2 depicts process 200 accordance with embodiments of the present disclosure. In one embodiment, process 200 is embodied as machine-readable instructions maintained in a non-transitory memory that when read by a machine, such as a processor of a server, cause the machine to execute the instructions and thereby execute process 200. The processor of the server may include, but is not limited to, at least one processor of command line monitor 114.

Process 200 begins and step 202 receives command line inputs. For example, command line monitor 114 may receive the command line inputs provided by terminal 108 and automated agent 112, which may also be received and executed by managed system 102. Step 202 may operate perpetually in parallel to other processes, such as to collect command line inputs over time. Test 204 may be optionally deployed to determine if any particular command line input (s) matches a known attack. Test 204 may be a programmatic test, such as if-then to identify the use of command line inputs that, by themselves, indicate an attack. If test 204 is determined in the affirmative, processing continues to step 210, wherein an intrusion attack response is initiated. If test 204 is determined in the negative, or test 204 is omitted, processing continues to step 206.

Step 206 evaluates the command line inputs, as a collection. For example, command line monitor 114 determines if a pattern is present that matches a reconnaissance attack. In one embodiment, command line monitor 114 provides the command line inputs to a neural network trained to identify reconnaissance attacks and receives therefrom an indication of whether or not the collection of command line inputs is a reconnaissance attack.

Neural networks, as they are known in the art and in one embodiment, self-configure layers of logical nodes having an input and an output. If an output is below a self-determined threshold level, the output is omitted (i.e., the inputs are within the inactive response portion of a scale and provide no output). If the self-determined threshold level is above the threshold, an output is provided (i.e., the inputs are within the active response portion of a scale and provide an output). The particular placement of the active and inactive delineation is provided as a training step or steps. Multiple inputs into a node produce a multi-dimensional plane (e.g., hyperplane) to delineate a combination of inputs that are active or inactive.

In another embodiment, the neural network may be trained and one or more stochastic techniques can be employed. As a result, a decision may be made that a reconnaissance attack, which may not be an exact match to a previously known reconnaissance attack, is nevertheless matched above a previously, and/or dynamically determined, threshold to a reconnaissance attack pattern. In another embodiment, a Convolution Neural Network or a Transformer Based Neural Networks explains a set of observations through unobserved groups, such as to determine a topic, theme, or purpose of a set of command line inputs. In another embodiment, the neural network is or comprises long short-term memory (LSTM), such as to process a sequence (ordered or unordered) of command line inputs. A LSTM unit is comprised of a cell, an input gage, an output gate, and a forget gate. The cell remembers values over arbitrary time intervals and the three gates regulate how information flows into and out of the cell.

Test 208 is determined in the affirmative when a match is determined to be present from the collection of inputs (from step 206) to a reconnaissance action and, as a result, processing continues to step 210. If test 208 is determined in the negative, process 200 may execute perpetually, or until interrupted, such as by looping back to step 202. If an attack is determined, step 210 may execute one or more attack responses designed to mitigate attacks (intrusion or otherwise), repair a vulnerability, protect managed system 102 and other components 106, identify an actor behind an attack, and/or other security action. The response(s) may be fixed for all attacks or selected in accordance with the severity or particular actions of the reconnaissance attack. For example, step 210 may initiate an alert to a supervisor or security device to monitor the command line inputs and/or the actions of human agent 110 more closely, review the operations of automated agent 112, etc. Other actions may include artificially delaying or altering results coming from managed system 102. For example, showing a particular port of a component of managed system 102 as having a vulnerability when in actuality the vulnerability does not exist. Other actions include disconnecting terminal 108 or automated agent 112 to break the communication occurring via network 104.

Figure 3:
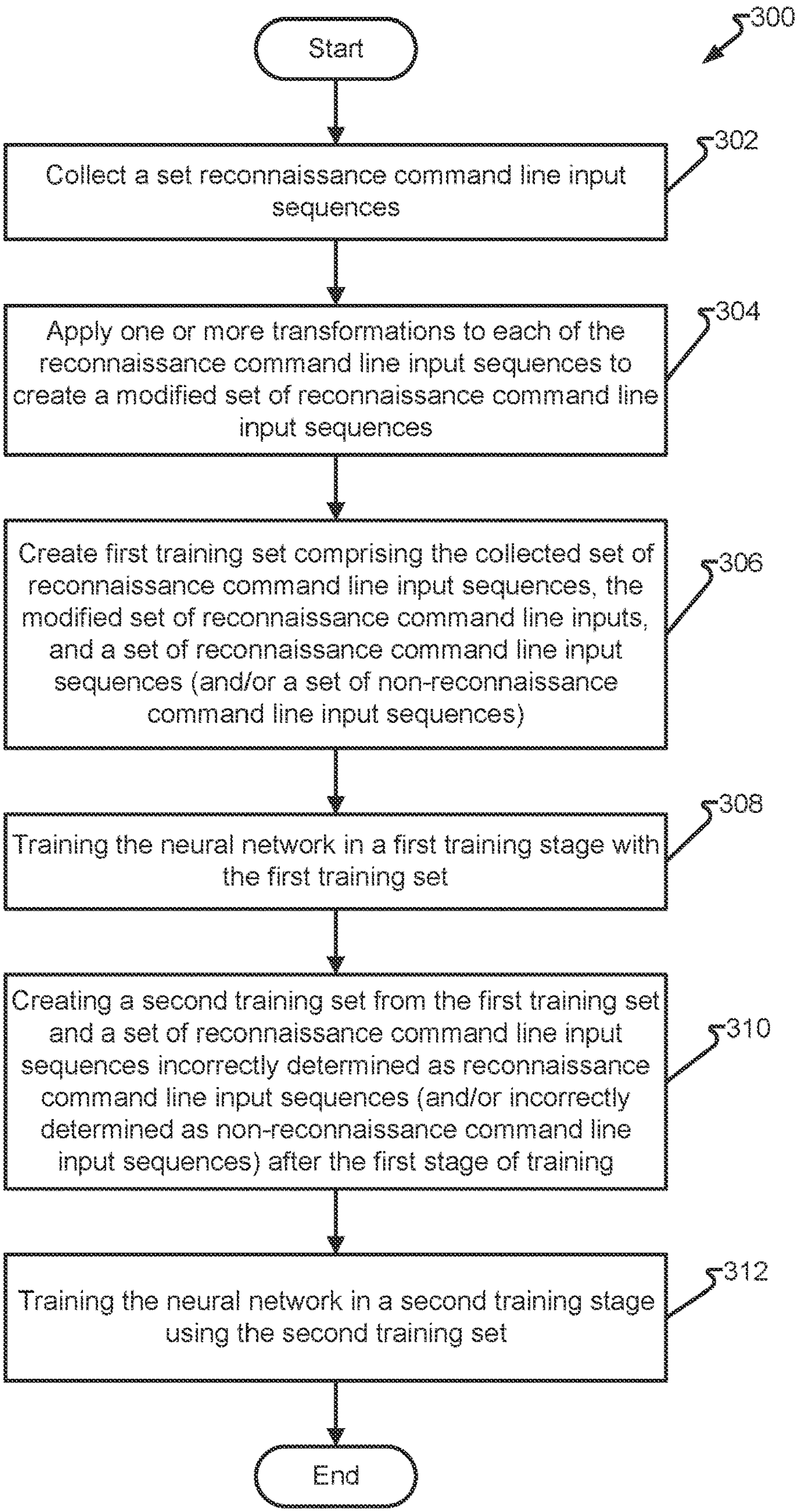
FIG. 3 depicts a process in accordance with embodiments of the present disclosure.

FIG. 3 depicts process 300 in accordance with embodiments of the present disclosure. In one embodiment, process 300 is embodied as machine-readable instructions maintained in a non-transitory memory that when read by a machine, such as processors of a server, cause the machine to execute the instructions and thereby execute process 300. The processor of the server may include, but is not limited to, at least one processor of command line monitor 114.

Process 300 may be performed, at least once, prior to receiving a reconnaissance command line input sequence and thereby be trained to provide indicia of a match (or absence of a match) between a reconnaissance command line input sequence and a reconnaissance attack. Process 300 may be subsequently performed, such as to retrain/refine the training of the neural network based on subsequently acquired knowledge of command line input sequences that are (or are not) reconnaissance attacks and, as a result, reduce the number of false positives and/or false negatives.

Process 300 begins and, at step 302, collects a set of reconnaissance command line input sequences, such as from a database or other repository accessible to a processor executing process 300. Step 304 then applies one or more transformations to each of the reconnaissance command line input sequences to create a modified set of reconnaissance command line input sequences. The transformations include inserting at least one command line input, removing at least one command line input, altering a parameter of at least one command line input, reordering at least two command line inputs, adding or removing a delay between at least two command line inputs, and inserting at least one input not recognized as a command line input.

Step 306 creates a first training set comprising the collected set of reconnaissance command line input sequences, the modified set of reconnaissance command line inputs, and a set of reconnaissance command line input sequences (and/or a set of non-reconnaissance command line input sequences). Step 308 trains the neural network in a first training stage with the first training set.

Step 310 creates a second training set from the first training set and a set of reconnaissance command line input sequences incorrectly determined as reconnaissance command line input sequences (and/or incorrectly determined as non-reconnaissance command line input sequences) after the first stage of training. Step 312 trains the neural network in a second training stage using the second training set.

After at least one iteration of process 300, the trained neural network may be provided with a command line input sequence and determine therefrom whether there is a match to a reconnaissance attack or not and respond accordingly (see, FIG. 2, step 210).

Figure 4:
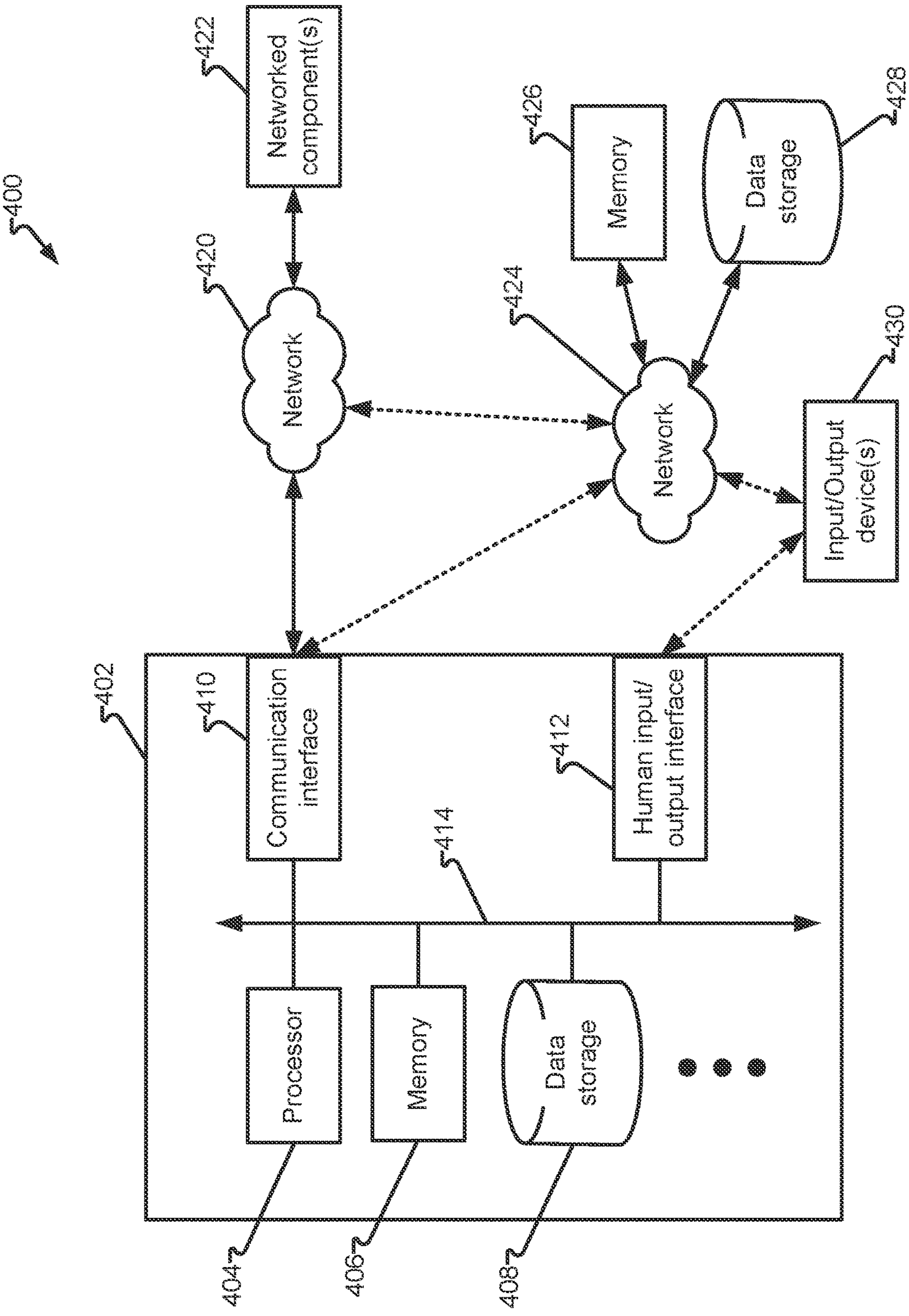
FIG. 4 depicts a system in accordance with embodiments of the present disclosure.

FIG. 4 depicts device 402 in system 400 in accordance with embodiments of the present disclosure. In one embodiment, each of command line monitor 114, terminal 108, and automated agent 112 may be embodied, in whole or in part, as device 402 comprising various components and connections to other components and/or systems. The components are variously embodied and may comprise processor 404. The term "processor," as used herein, refers exclusively to electronic hardware components comprising electrical circuitry with connections (e.g., pin-outs) to convey encoded electrical signals to and from the electrical circuitry. Processor 404 may comprise programmable logic functionality, such as determined, at least in part, from accessing machine-readable instructions maintained in a non-transitory data storage, which may be embodied as circuitry, on-chip read-only memory, computer memory 406, data storage 408, etc., that cause the processor 404 to perform the steps of the instructions. Processor 404 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 414, executes instructions, and outputs data, again such as via bus 414. In other embodiments, processor 404 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 404 is a non-transitory computing device (e.g., electronic machine comprising circuitry and connections to communicate with other components and devices). Processor 404 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 404). Processor 404 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 404, device 402 may utilize computer memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, speaker, microphone, still and/or video camera, etc. In another embodiment, communication interface 410 may comprise, or be comprised by, human input/output interface 412. Communication interface 410 may be configured to communicate directly with a networked component or configured to utilize one or more networks, such as network 420 and/or network 424.

Network 104 may be embodied, in whole or in part, as network 420. Network 420 may be a wired network (e.g., Ethernet), wireless (e.g., WiFi, Bluetooth, cellular, etc.) network, or combination thereof and enable device 402 to communicate with networked component(s) 422. In other embodiments, network 420 may be embodied, in whole or in part, as a telephony network (e.g., public switched telephone network (PSTN), private branch exchange (PBX), cellular telephony network, etc.).

Additionally or alternatively, one or more other networks may be utilized. For example, network 424 may represent a second network, which may facilitate communication with components utilized by device 402. For example, network 424 may be an internal network to a business entity or other organization, whereby components are trusted (or at least more so) than networked components 422, which may be connected to network 420 comprising a public network (e.g., Internet) that may not be as trusted.

Components attached to network 424 may include computer memory 426, data storage 428, input/output device(s) 430, and/or other components that may be accessible to processor 404. For example, computer memory 426 and/or data storage 428 may supplement or supplant computer memory 406 and/or data storage 408 entirely or for a particular task or purpose. As another example, computer memory 426 and/or data storage 428 may be an external data repository (e.g., server farm, array, "cloud," etc.) and enable device 402, and/or other devices, to access data thereon. Similarly, input/output device(s) 430 may be accessed by processor 404 via human input/output interface 412 and/or via communication interface 410 either directly, via network 424, via network 420 alone (not shown), or via networks 424 and 420. Each of computer memory 406, data storage 408, computer memory 426, data storage 428 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 430 may be a router, a switch, a port, or other communication component such that a particular output of processor 404 enables (or disables) input/output device 430, which may be associated with network 420 and/or network 424, to allow (or disallow) communications between two or more nodes on network 420 and/or network 424. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:

at least one processor comprising a first processor;

an input component to receive command line inputs to the system;

wherein the first processor monitors the command line inputs and wherein each individual command line input comprises an authorized command;

wherein the first processor evaluates a series of the command line inputs as a collection and determines therefrom whether a match exists between the series of the command line inputs and a reconnaissance attack; and wherein, upon the first processor determining that the series of the command line inputs matches the reconnaissance attack, the first processor initiates an intrusion response action.

2. The system of claim 1, wherein the system executes each of the series of the command line inputs.

3. The system of claim 2, wherein:

the at least one processor further comprises a second processor; and the second processor executes each of the series of the command line inputs.

4. The system of claim 1, wherein the first processor determines the series of the command line inputs matches the reconnaissance attack upon providing the series of the command line inputs to a neural network trained to determine reconnaissance attacks and receiving therefrom indica of a match.

5. The system of claim 4, wherein the neural network executes one of a Convolution Based Neural Networks, Recurrent Neural Network, or a Transformer based Neural network model machine learning model.

6. The system of claim 4, wherein the neural network executes a long-term memory (LSTM) machine learning model.

7. The system of claim 4, wherein the neural network is trained comprising:

collecting a set of reconnaissance command line input sequences from a database;

applying one or more transformations to the set of reconnaissance command line input sequences to create a modified set of reconnaissance command line input sequences, the transformations including one or more of inserting at least one command line input, removing at least one command line input, altering a parameter of at least one command line input, reordering at least two command line inputs, adding or removing a delay between at least two command line inputs, and inserting at least one input not recognized as a command line input;

creating a first training set comprising the collected set of reconnaissance command line input sequences, the modified set of reconnaissance command line input sequences, and a set of non-reconnaissance command line input sequences;

training the neural network in a first stage using the first training set;

creating a second training set for a second stage of training comprising the first training set and the set of non-reconnaissance command line input sequences that are incorrectly detected as reconnaissance command line input sequences after the first stage of training; and training the neural network in the second stage using the second training set.

8. The system of claim 4, wherein the neural network is trained comprising:

collecting a set of reconnaissance command line input sequences from a database;

applying one or more transformations to the set of reconnaissance command line input sequences to create a modified set of reconnaissance command line input sequences, the transformations including one or more of inserting at least one command line input, removing at least one command line input, altering a parameter of at least one command line input, reordering at least two command line inputs, adding or removing a delay between at least two command line inputs, and inserting at least one input not recognized as a command line input;

creating a first training set comprising the collected set of reconnaissance command line input sequences, the modified set of reconnaissance command line input sequences, and a set of non-reconnaissance command line input sequences;

training the neural network in a first stage using the first training set;

creating a second training set for a second stage of training comprising the first training set and the set of sequences of reconnaissance command line inputs that are incorrectly detected as non-reconnaissance command line input sequences after the first stage of training; and training the neural network in the second stage using the second training set.

9. The system of claim 1, wherein the intrusion response action comprises generating an alert and transmitting the alert to a security component.

10. The system of claim 1, wherein the intrusion response action comprises providing an alternate output from at least one of the command line inputs.

11. A method for protecting a system, comprising:

receiving command line inputs to the system;

monitoring the command line inputs, wherein each individual command line input comprises an authorized command;

evaluating a series of the command line inputs as a collection and determining therefrom whether a match exists between the series of the command line inputs and a reconnaissance attack; and wherein, upon determining that the series of the command line inputs matches the reconnaissance attack, initiating an intrusion response action.

12. The method for protecting the system of claim 11, wherein at least one processor of the system executes each of the series of the command line inputs.

13. The method for protecting the system of claim 12, wherein:

the at least one processor further comprises a second processor; and the second processor executes each of the series of the command line inputs.

14. The method for protecting the system of claim 11, wherein determining that the series of the command line inputs matches the reconnaissance attack comprises providing the series of the command line inputs to a neural network trained to determine reconnaissance attacks and receiving therefrom indica of a match.

15. The method for protecting the system of claim 14, wherein the neural network executes one of a Convolution Based Neural Networks, Recurrent Neural Network, or a Transformer based Neural network model machine learning model.

16. The method for protecting the system of claim 14, wherein the neural network executes a long-term memory (LSTM) machine learning model.

17. The method for protecting the system of claim 14, wherein the neural network is trained comprising:

collecting a set of reconnaissance command line input sequences from a database;

applying one or more transformations to the set of reconnaissance command line input sequences to create a modified set of reconnaissance command line input sequences, the transformations including one or more of inserting at least one command line input, removing at least one command line input, altering a parameter of at least one command line input, reordering at least two command line inputs, adding or removing a delay between at least two command line inputs, and inserting at least one input not recognized as a command line input;

creating a first training set comprising the collected set of reconnaissance command line input sequences, the modified set of reconnaissance command line input sequences, and a set of non-reconnaissance command line input sequences;

training the neural network in a first stage using the first training set;

creating a second training set for a second stage of training comprising the first training set and the set of non-reconnaissance command line input sequences that are incorrectly detected as reconnaissance command line input sequences after the first stage of training; and training the neural network in the second stage using the second training set.

18. The method for protecting the system of claim 14, wherein the neural network is trained comprising:

collecting a set of reconnaissance command line input sequences from a database;

applying one or more transformations to the set of sequences of reconnaissance command line inputs to create a modified set of reconnaissance command line input sequences, the transformations including one or more of inserting at least one command line input, removing at least one command line input, altering a parameter of at least one command line input, reordering at least two command line inputs, adding or removing a delay between at least two command line inputs, and inserting at least one input not recognized as a command line input;

creating a first training set comprising the collected set of reconnaissance command line input sequences, the modified set of reconnaissance command line input sequences, and a set of non-reconnaissance command line input sequences;

training the neural network in a first stage using the first training set;

creating a second training set for a second stage of training comprising the first training set and the set of reconnaissance command line input sequences that are incorrectly detected as non-reconnaissance command line input sequences after the first stage of training; and training the neural network in the second stage using the second training set.

19. A monitoring component attached to a system, comprising:

a processor; and an input interface to receive, from a system, command line inputs to the system;

wherein the processor monitors the command line inputs and wherein each individual command line input comprises an authorized command;

wherein the processor evaluates a series of the command line inputs as a collection and determines therefrom whether a match exists between the series of the command line inputs and a reconnaissance attack; and wherein, upon the processor determining that the series of the command line inputs matches the reconnaissance attack, provides an intrusion signal to a security component of the system.

20. The monitoring component attached to the system of claim 19, wherein the processor determines that the series of the command line inputs matches the reconnaissance attack comprises providing the series of the command line inputs to a neural network trained to determine reconnaissance attacks and receiving therefrom indica of a match.

* * * * *